United States Patent
Fonseca, Jr. et al.

(10) Patent No.: US 7,792,059 B2
(45) Date of Patent: Sep. 7, 2010

(54) METHOD AND SYSTEM FOR TRANSITIONING BETWEEN A DISTRIBUTED AD HOC NETWORK ARCHITECTURE AND A CLUSTER AD HOC NETWORK ARCHITECTURE

(75) Inventors: Benedito J. Fonseca, Jr., Glen Ellyn, IL (US); George Calcev, Hoffman Estates, IL (US); James P. Michels, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 107 days.

(21) Appl. No.: 11/849,434

(22) Filed: Sep. 4, 2007

(65) Prior Publication Data

US 2009/0059795 A1 Mar. 5, 2009

(51) Int. Cl.
*H04L 12/28* (2006.01)
(52) U.S. Cl. .................. 370/255; 370/254; 709/238
(58) Field of Classification Search ......... 370/257–258; 709/238
See application file for complete search history.

(56) References Cited

U.S. PATENT DOCUMENTS

| | | | |
|---|---|---|---|
| 7,061,895 B1 | 6/2006 | Habetha | |
| 7,120,456 B1 * | 10/2006 | Elliot et al. | 455/517 |
| 7,120,681 B2 | 10/2006 | Frelechoux et al. | |
| 7,281,057 B2 * | 10/2007 | Cain | 709/238 |
| 7,418,494 B2 * | 8/2008 | Dahlin et al. | 709/224 |
| 2002/0103893 A1 | 8/2002 | Frelechoux et al. | |
| 2003/0041150 A1 * | 2/2003 | Passman et al. | 709/227 |
| 2004/0097240 A1 * | 5/2004 | Chen et al. | 455/450 |
| 2004/0128387 A1 | 7/2004 | Chin et al. | |
| 2005/0091396 A1 * | 4/2005 | Nilakantan et al. | 709/232 |
| 2005/0117530 A1 | 6/2005 | Abraham et al. | |
| 2005/0281243 A1 * | 12/2005 | Horn et al. | 370/345 |
| 2005/0286416 A1 * | 12/2005 | Shimonishi et al. | 370/229 |
| 2006/0015902 A1 | 1/2006 | Matsuura et al. | |
| 2006/0067226 A1 * | 3/2006 | Chandra et al. | 370/235 |
| 2006/0120303 A1 | 6/2006 | Yarvis et al. | |
| 2006/0140135 A1 | 6/2006 | Bonta et al. | |
| 2006/0159024 A1 | 7/2006 | Hester | |
| 2006/0165012 A1 | 7/2006 | Habetha | |
| 2006/0227724 A1 * | 10/2006 | Thubert et al. | 370/254 |
| 2007/0201381 A1 | 8/2007 | Ekl et al. | |
| 2007/0201382 A1 | 8/2007 | Ekl et al. | |
| 2007/0204021 A1 | 8/2007 | Ekl et al. | |

(Continued)

OTHER PUBLICATIONS

PCT International Search Report Application No. PCT/US2008/074466 Dated Dec. 29, 2008—10 Pages.
Jane Y. Yu and Peter H.J. Chong, "A Survey of Clustering Schemes for Mobile As Hoc Networks," IEEE Communication Surveys, vol. 7 No. 1, pp. 32-48, May 2005—17 Pages.
"Efficient Flooding in Ad Hoc Networks Using On-Demand (Passive)Cluster Formation"—MOBIHOC 2002—12pp.

(Continued)

*Primary Examiner*—William Trost, IV
*Assistant Examiner*—Siming Liu
(74) *Attorney, Agent, or Firm*—Randi L. Karpinia

(57) ABSTRACT

Techniques are provided for detecting an increase in congestion in a distributed ad hoc network architecture and transitioning from the distributed ad hoc network architecture to a cluster ad hoc network architecture when a sufficient increase in congestion is detected based on one or more congestion level indicator values (CLIVs). Other techniques are provided for detecting a decrease in congestion in cluster ad hoc network architecture and transitioning from the cluster ad hoc network architecture to a distributed ad hoc network architecture when a sufficient decrease in congestion is detected based on one or more congestion level indicator values (CLIVs).

25 Claims, 8 Drawing Sheets

U.S. PATENT DOCUMENTS

| | | | |
|---|---|---|---|
| 2007/0286351 A1* | 12/2007 | Ethier et al. | 379/32.01 |
| 2008/0056125 A1* | 3/2008 | Kneckt et al. | 370/229 |
| 2008/0248802 A1* | 10/2008 | Krishnamoorthy | 455/445 |
| 2009/0034432 A1* | 2/2009 | Bonta et al. | 370/255 |
| 2009/0109891 A1 | 4/2009 | Fonseca et al. | |

OTHER PUBLICATIONS

"Max-Min D-cluster Formation in Wireless Ad Hoc Networks"—Arnis et al, IEEE INFOCOM 2000—p. 32-41.

"Cluster-based Congestion Control for Supporting Multiple Classes of Traffic in Sensor Networks"—Karenos et al—8pp.

* cited by examiner

METHOD AND SYSTEM FOR TRANSITIONING BETWEEN A DISTRIBUTED AD HOC NETWORK ARCHITECTURE AND A CLUSTER AD HOC NETWORK ARCHITECTURE

FIELD OF THE INVENTION

The present invention relates generally to wireless communications and more particularly to hybrid ad hoc networks which dynamically transition and transform between a distributed ad hoc network architecture and a cluster ad hoc network architecture to meet network demands.

BACKGROUND

Types of wireless networks include infrastructure-based wireless networks and ad hoc wireless networks.

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly, techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of ad hoc network nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node maintains routing information collected through conversation with its neighboring nodes. The routing information can also be periodically broadcast in the network to reflect the current network topology. Alternatively, to reduce the amount of information transmitted for maintaining accurate routing information, the network nodes may exchange routing information only when it is needed.

Ad hoc networks can generally be categorized into two different system architectures which support different control and/or resource allocation protocols. In distributed ad hoc network architectures, each node shares the entire spectrum with other nodes, and each node acts independently in selection of resources (e.g., frequency, time or code allocations). By contrast, in cluster ad hoc network architectures, a clusterhead node acts as a centralized point of control and manages resource allocation, control, and management functions for a cluster of proximate nodes somewhat like a base station in conventional cellular networks. Among other functions, the clusterhead node can direct control information and data traffic to appropriate nodes in the network. Adjacent clusters share resources, such as, time, frequency, or code allocations. The clusterhead node allocates resources among proximate nodes (associated with the clusterhead node) in its cluster based on service requests from the proximate nodes.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
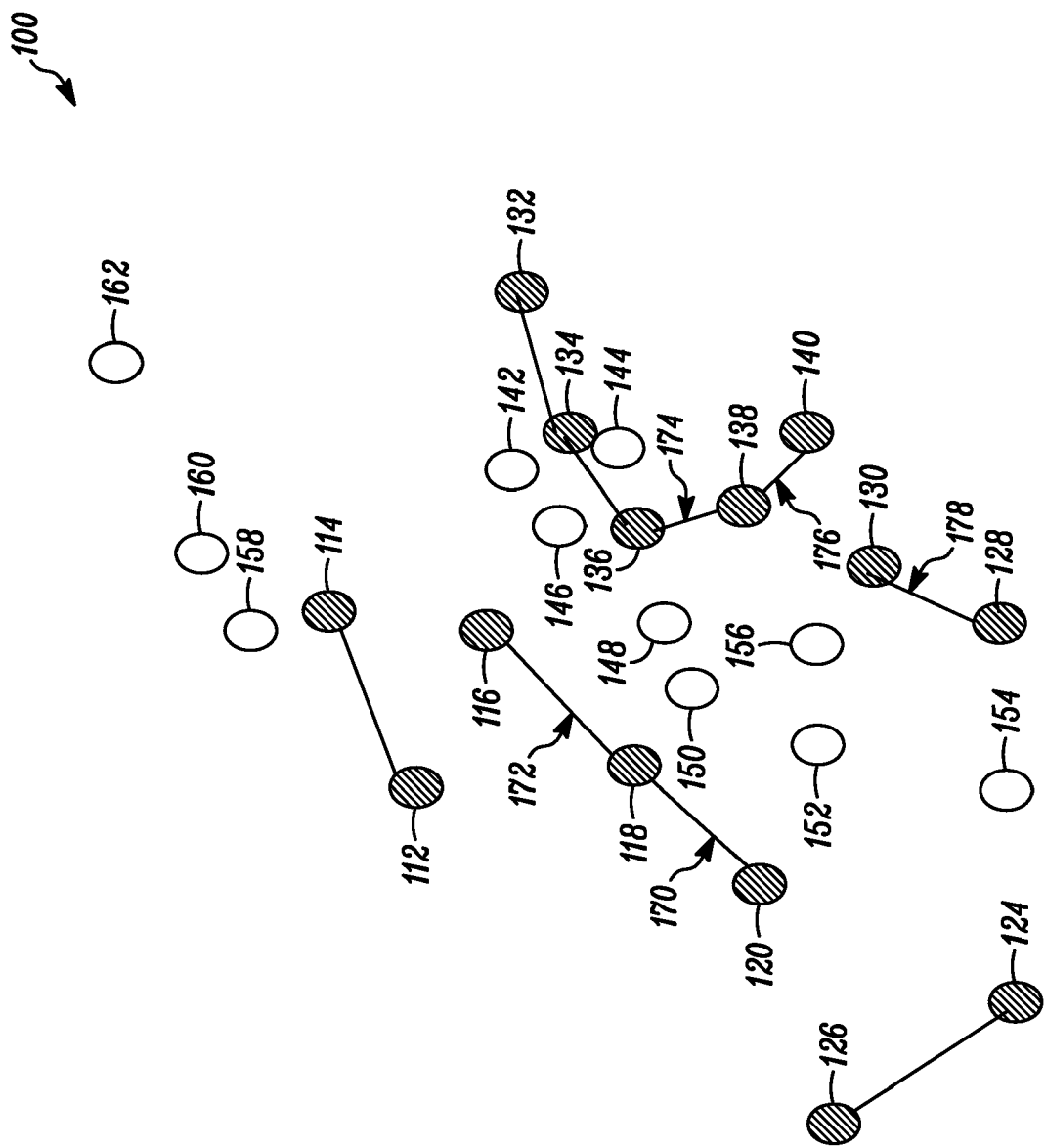
FIG. 1 is a block diagram of an ad hoc network when nodes operate operating in a distributed ad hoc network architecture and are not experiencing congestion.

Skilled artisans will appreciate that elements in the figures are illustrated for simplicity and clarity and are not drawn to scale.

DETAILED DESCRIPTION

Before describing in detail embodiments that are in accordance with the present invention, it should be observed that the embodiments reside primarily in combinations of method steps and apparatus components related to detecting an increase in congestion in a distributed ad hoc network architecture and transitioning from the distributed ad hoc network architecture to a cluster ad hoc network architecture when a sufficient increase in congestion is detected, and to detecting a decrease in congestion in cluster ad hoc network architecture and transitioning from the cluster ad hoc network architecture to a distributed ad hoc network architecture when a sufficient decrease in congestion is detected. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for detecting an increase in congestion in a distributed ad hoc network architecture and transitioning from the distributed ad hoc network architecture to a cluster ad hoc network architecture when a sufficient increase in congestion is detected, and to detecting a decrease in congestion in cluster ad hoc network architecture and transitioning from the cluster ad hoc network architecture to a distributed ad hoc network architecture when a sufficient decrease in congestion is detected. The non-processor circuits may include, but are not limited to, a radio receiver, a radio transmitter, signal drivers, clock circuits, power source circuits, and user input devices. As such, these functions may be interpreted as steps of a method for detecting an increase in congestion in a distributed ad hoc network architecture and transitioning from the distributed ad hoc network architecture to a cluster ad hoc network architecture when a sufficient increase in congestion is detected, and to detecting a decrease in congestion in cluster ad hoc network architecture and transitioning from the cluster ad hoc network architecture to a distributed ad hoc network architecture when a sufficient decrease in congestion is detected. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

Any embodiment described herein is not necessarily to be construed as preferred or advantageous over other embodiments. All of the embodiments described in this Detailed Description are illustrative and are described to enable persons skilled in the art to make or use the invention and not to limit the scope of the invention which is defined by the claims.

Hybrid ad hoc networks are currently being designed in which nodes operating in those networks can function as part of a distributed ad hoc architecture or a cluster ad hoc architecture depending on network demands and parameters such as traffic conditions within the network. Such hybrid ad hoc networks combine advantages associated with distributed ad hoc network architectures and cluster ad hoc network architectures. Such hybrid ad hoc networks can provide a flexible, scalable ad hoc networking capability which adapts or transitions from distributed ad hoc network architecture to a cluster ad hoc network architecture when network demands change (e.g., as traffic levels increase).

Overview of Distributed Ad Hoc Network Architecture

Distributed architecture ad hoc networks can provide adaptability in ad hoc networks with low traffic, low user density, and/or low contention, while also providing simplicity with respect to network formation. Distributed ad hoc network architectures can be useful in small ad hoc networks which include a small number of nodes (e.g., less than twenty nodes) that want to exchange content or traffic. Distributed ad hoc network architectures can form quickly with little overhead. Distributed architecture networks are easily configurable for low traffic environments, and are optimal, for example, in peer to peer (P2P) applications where bursts of traffic or content are exchanged, and are well suited, for example, to enable multi-hop networks and networks with a multi-hop backhaul.

Overview of Cluster Ad Hoc Network Architecture

When the number of nodes in the network increase and/or traffic loads within the network increase, then "congestion" in the network and packet collisions also tends to increase. In such cases, a cluster ad hoc network architecture is desirable so that one of the nodes (clusterhead node) organizes the communications in its neighborhood such that resources are used more efficiently. Similarly, when the number of nodes in the network decrease and/or traffic loads within the network decrease, nodes of the network can decide to return to operate in the distributed architecture. By allowing the transition from a distributed to cluster ad hoc network architecture and vice-versa, the network can adapt, scale, meet capacity demands, efficiently allocate resources and manage interference.

State-of-the-art ad hoc networks, such as those described in United States Patent Application Publication Number 20090034432, assigned to the assignee of the present invention, and which entire contents are incorporated herein by reference, combine distributed and clustered architectures to provide hybrid ad hoc networks which can dynamically transition and transform between distributed and clustered architectures to meet network demands. As used herein, the term "network demands" includes parameters which can vary depending on, for example, the number of nodes, traffic demands, network capacity, topology/node distribution, spatial reuse requirements to mitigate self interference, and/or external interference mitigation requirements. In these situations, a distributed control ad hoc network architecture adapts to the traffic demands and transitions into a cluster ad hoc network architecture and vice-versa. The medium access control (MAC) layer used in clustered architecture networks enables scalability for high density environments, and is well-suited, for example, for Metro-Broadband applications demanding maximum capacity.

In accordance with some embodiments of the present invention, to adapt and scale a distributed ad hoc network into a cluster ad hoc network, techniques are provided for enabling one or more nodes to recognize network congestion and then initiate a transition from a distributed ad hoc network architecture to a cluster ad hoc architecture. For example, in one implementation techniques are provided for detecting an increase in congestion in a distributed ad hoc network architecture and initiating a transition from the distributed ad hoc network architecture to a cluster ad hoc network architecture when a sufficient increase in congestion is detected based on one or more congestion level indicator values (CLIVs).

The broadcast nature of the wireless channel allows a node to monitor communications from neighboring nodes. These communications can be along the links that the node is communicating over and/or along links in which the node is not communicating over and/or along links in which a subset of the neighbor nodes of the node are communicating over. From these communications, the node can determine any one of a number of congestion level indicator values (CLIVs), as will be described below, and can detect increases or decreases in congestion in the network based on one or more congestion level indicator values (CLIVs).

When congestion is detected by the node, the node triggers formation of a cluster ad hoc network architecture. Thus, when a distributed node experiences or detects congestion within its distributed ad hoc network architecture, the distributed node can initiate a transition from the distributed ad hoc network architecture to a cluster ad hoc architecture by communicating with neighbor nodes in its distributed ad hoc network.

For example, in one embodiment, techniques are provided for forming a cluster ad hoc network architecture in a network of nodes. When a node determines that it is presently part of a distributed ad hoc network architecture, the node determines or measures one or more congestion level indicator values (CLIVs). The CLIVs can be determined or measured based on information received from other nodes, where the information received from other nodes can include one or more of: (1) information that the other nodes explicitly provide to the first node relating to their view of congestion, and/or (2) measurements made by the first node which can be used to characterize congestion, and/or (3) information that the first node gathers implicitly from observations of the other nodes.

The node then determines, based on one or more of the measured-congestion level indicator values (MCLIVs), whether at least one of the measured-congestion level indicator values (MCLIVs) exceed respective threshold values for the congestion level indicators. When at least one measured congestion level indicator value exceeds a respective threshold value for a particular congestion level indicator, the node transmits a cluster formation request message to request that other nodes join a cluster ad hoc network architecture. In some implementations, the cluster formation request message may also include the node's measured-congestion level indicator values (MCLIVs).

Each node that receives one or more cluster formation request messages, stores measured-congestion level indicator values (MCLIVs) provided in its received cluster formation request messages. Nodes which decide to join the cluster ad hoc network architecture eventually use their stored measured-congestion level indicator values (MCLIVs) to nominate and/or select a clusterhead node.

In one embodiment, all nodes of the network monitor and detect congestion and participate in the message exchange. In an alternative embodiment, a subset of nodes of the network would monitor and detect congestion and participate on the message exchange, while another subset would decide not to perform such functions. The subset of nodes that participate in the monitoring, detection and message exchange can be defined as the nodes that are involved in the transmission or reception of packets in a link; however, any criterion can be used to define the subset of participating nodes. In a further alternative embodiment, nodes would perform such functions at various degrees of participation.

In other embodiments, techniques are provided which can allow a clusterhead node to detect a decrease in congestion in cluster ad hoc network architecture, and then initiate a transition from the cluster ad hoc network architecture to a distributed ad hoc network architecture when one or more congestion indicators fall below a certain threshold or are no longer present. To transition a cluster ad hoc network into a distributed ad hoc network, techniques are provided for enabling one or more nodes to recognize that operation in the cluster ad hoc network is no longer necessary and then initiate a transition from a cluster ad hoc network architecture to a distributed ad hoc architecture. For instance, in one implementation, the transition from the cluster ad hoc network architecture to a distributed ad hoc network architecture can be triggered when the clusterhead node detects a sufficient decrease in congestion based on one or more congestion level indicator values (CLIVs).

Example embodiments will now be described below with reference to FIGS. 1-8.

FIG. 1 is a block diagram of an ad hoc network 100 when nodes are operating in a distributed ad hoc network architecture 100, and when nodes 116-156 in the network 100 are not experiencing congestion. In FIG. 1, a plurality of nodes 116-156 are present, where nodes 112, 114, 116, 118, 120, 124, 126, 128, 130, 132, 134, 136, 138, 140 illustrated with cross-hatched circles are actively communicating with other nodes as represented by lines or communication links which connect particular ones of the nodes 112, 114, 116, 118, 120, 124, 126, 128, 130, 132, 134, 136, 138, 140. By contrast, nodes 142, 144, 146, 148, 150, 152, 154, 156, 158, 160, 162, which are illustrated with regular (i.e., non-cross-hatched) circles, represent nodes which are not actively communicating with other nodes and therefore have no lines or communication links connecting those nodes 142, 144, 146, 148, 150, 152, 154, 156, 158, 160, 162 to other nodes.

Figure 2:
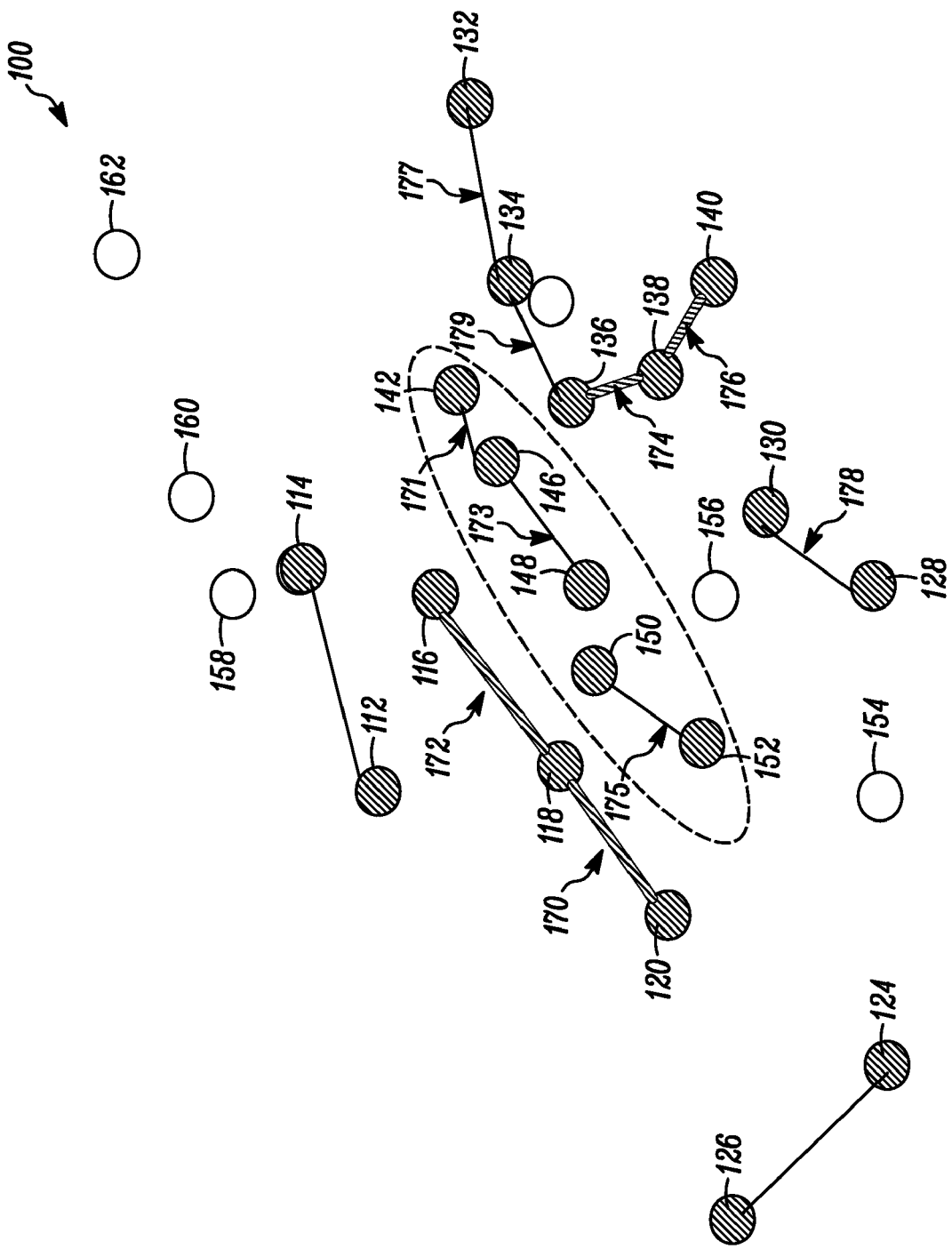
FIG. 2 is a block diagram of the distributed ad hoc network architecture of FIG. 1 at another time when some of the nodes experience congestion.

FIG. 2 is a block diagram of the distributed ad hoc network architecture 100 of FIG. 1 at another time when nodes 142, 146, 148, 150, 152, which were not involved in any communication flow in FIG. 1, have started a new communication flow (as illustrated with the dashed-line shape in FIG. 2) taking place along communication links between nodes 142, 146, 148, and nodes 150 and 152. The new communication flows between nodes 142, 146, 148, and nodes 150 and 152 cause some of the nodes 116, 118, 120, 136, 138, 140 to experience "congestion." As used herein, the term "congestion" refers to a situation where communication links between nodes are unable to support communication flows between nodes with adequate throughput (e.g., to meet quality of service (QoS) requirements of the particular communication flow). In FIG. 2, the "congested" links 170, 172, 174, 176 are illustrated using thick lines to differentiate the congested links 170, 172, 174, 176 from other links (e.g., between 112 and 114) which are not congested.

Figure 3:
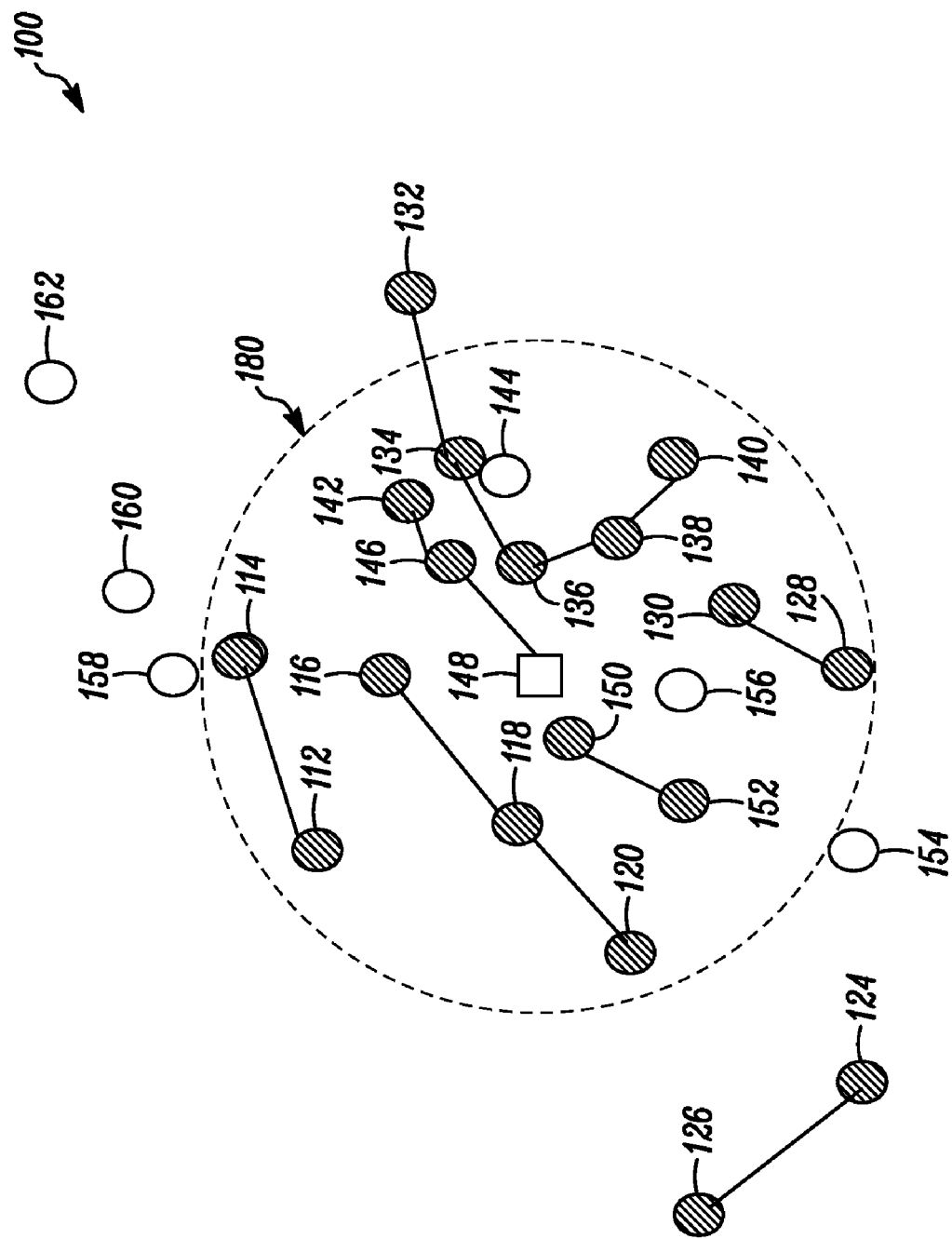
FIG. 3 is a block diagram of the ad hoc network of FIGS. 1 and 2 when at least some of the nodes, in response to detecting congestion in the distributed ad hoc network architecture, form a cluster ad hoc network architecture by nominating and selecting a clusterhead node in accordance with some embodiments of the invention.

FIG. 3 is a block diagram of the ad hoc network of FIGS. 1 and 2 when at least some of the nodes 112, 114, 116, 118, 120, 128, 130, 134, 136, 138, 140, 142, 146, 148, 150, 152, 156, in response to detecting congestion in the distributed ad hoc network architecture 100, form a cluster ad hoc network architecture 180 by selecting a clusterhead node 148 in accordance with some embodiments of the invention. Techniques for formation of the cluster ad hoc network architecture 180 will now be described below with reference to FIGS. 4-7.

Figure 4:
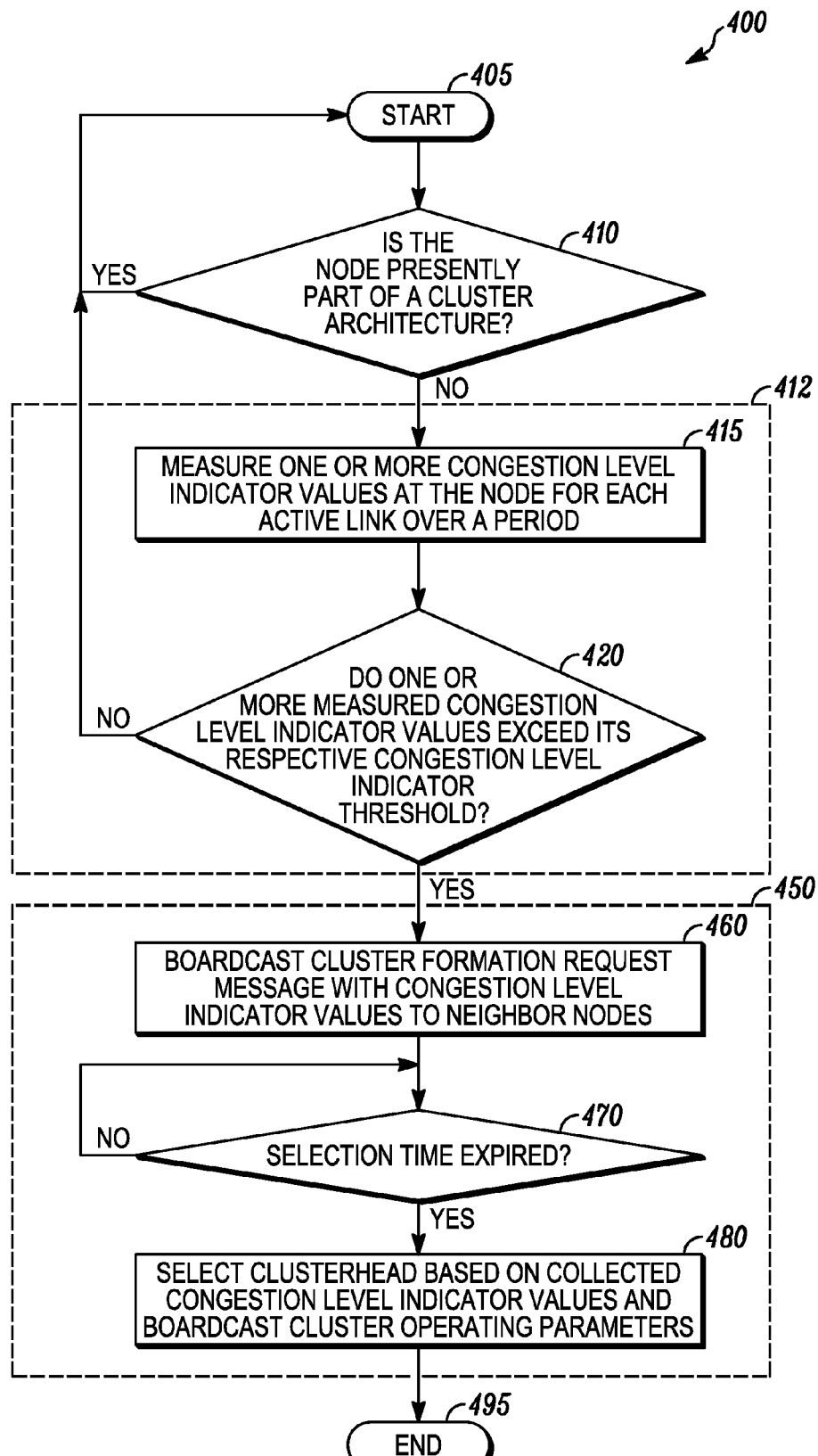
FIG. 4 is a flowchart showing a method for detecting congestion in an ad hoc network and triggering formation of a cluster ad hoc network architecture by at least some of the nodes in the ad hoc network in accordance with some embodiments of the invention.

Transition from a Distributed Ad Hoc Network Architecture to a Cluster Ad Hoc Network Architecture FIG. 4 is a flowchart showing a method 400 for detecting congestion in a distributed ad hoc network architecture 100 and triggering formation of a cluster ad hoc network architecture 180 by at least some of the nodes 112, 114, 116, 118, 120, 128, 130, 134, 136, 138, 140, 142, 146, 148, 150, 152 in the ad hoc network in accordance with some embodiments of the invention. FIG. 4 will be described with reference to a scenario where node 138 experiences and detects congestion on at least one of its communication links 174, 176, and thereafter triggers formation of the cluster ad hoc network architecture 180.

At step 410, node 138 determines whether the node 138 is presently part of a cluster ad hoc network architecture 180 or alternatively part of a distributed ad hoc network architecture 100. The node 138 can determine whether it is presently part of a cluster ad hoc network architecture 180 or alternatively a distributed ad hoc network architecture 100 by monitoring system information messages which are regularly transmitted by nodes and/or a clusterhead node when present. If the node 138 determines that the node 138 is presently part of a cluster ad hoc network architecture, then method 400 loops back to step 405 where the node 138 continues to monitor whether it is presently part of a cluster ad hoc network architecture.

When the node 138 determines that the node 138 is not presently part of a cluster ad hoc network architecture (e.g., is presently part of a distributed ad hoc network architecture 100), then the method 400 proceeds to step 412, where the node 138 attempts to detect congestion in the distributed ad hoc network architecture 100. In one implementation, the node 138 detects congestion via steps 415 and 420.

For example, at step 415, the node 138 determines or measures one or more congestion level indicator values (CLIVS) along each link 174, 176 that the node 138 is communicating on and/or along other links 171, 173, 178, 179 which neighbor nodes are communicating on (e.g., the link between nodes 148-146, the link between nodes 142-146, 136-134 and the link between nodes 134-132). The CLIVs can be determined or measured based on information received from other nodes, where the information received from other nodes can include one or more of: (1) information that the other nodes explicitly provide to the first node relating to their view of congestion, and/or (2) measurements made by the first node which can be used to characterize congestion, and/or (3) information that the first node gathers implicitly from observations of the other nodes. For example, the congestion level indicator values (CLIVs) may comprise any one of, or any combination of, a variety of congestion indicator metrics (CIMs) which can be used to provide indication of congestion in the vicinity of the node 138. The congestion indicator metrics (CIMs) can include any known Channel Quality Metrics (CQM) and Channel Capacity Metrics (CCMs).

The CQMs can be made during the reception, demodulation, and/or decoding of the message packet. For example, one CQM can be a received signal strength indicator (RSSI) value provided for each respective link, wherein the RSSI at which a data-packet is received by a node over a link is available from the physical layer. Another CQM can be a received sensitivity (RS) value of the receiving node receiving the data packets, wherein the receive sensitivity (RS) is the lowest level signal strength at which a received signal containing a data packet can be received in order for the node to be able to successfully recover data from the received data packet (i.e., any signal received with a value less than the threshold RS value will be viewed as noise). CQMs also include any other metrics used by an intermediate node to determine channel or link quality between a source/transmitter node and a destination/receiver node.

The CCMs include a packet error rate (PER) estimate or a bit-error rate (BER) estimate, the number of multipath signals present during demodulation, a post-detection signal quality (PDSQ) value, and an analog gain control (AGC) output. The number of multipath signals is estimated, for example, by the counting the number of taps employed by the RAKE processor within a direct sequence spread spectrum (DSSS) modem. The number of multipath signals is used in estimating the link margin and the severity of the multipath. The PDSQ is obtained from outputs of a correlator during demodulation and is used in estimating the link margin and the severity of the multipath or other interference. The AGC system is used in estimating the total power of the received signal and the resulting link margin.

Depending on the specific implementation, the congestion indicator metrics (CIMs) can include one or any combination of, for example:

a ratio of a period during which a channel is sensed as being busy with respect to an overall measurement period;

a difference between inbound data rate of a given data flow and outbound data rate of the given data flow;

a packet queuing delay;

a forecasted data load based on flow setup control messages exchanged on a common channel;

a data load computed based on the number of data flows and their respective traffic characteristics (e.g., a node compares the computed data load with an advertised or known maximum data load);

a ratio of busy resources in a resource allocation message;

a transmitted power level (TPL) at which the respective data packets were transmitted by the transmitting node over the respective links (e.g., the power level at which the node finds it necessary to transmit a data-packet over the link);

an average of a number of retransmissions per packet (e.g., how many packets are transmitted with up to a pre-defined number of retransmissions);

a percentile of the number of retransmissions per packet (e.g., how many packets are transmitted with up to a pre-defined number of retransmissions);

packet error rate (PER) or average packet error rate (PER) or percentile of the packet error rate; and signal-to-noise ratio (SNR) of the received signal (usually measured in terms of $E_b/N_0$, which stands for energy per bit divided by the one-sided noise density) or an average thereof, and signal-to-interference-plus-Noise Ratio (SINR) in previous packets successfully received (e.g., a congestion level indicator can be the product PER×SINR, which would be high in congestion cases caused by eventual hidden nodes) or an average thereof.

At step 420, the node 138 determines, based on the measured congestion level indicator values (MCLIVs), whether at least one of the measured congestion level indicator values (MCLIVs) exceed respective threshold values for those respective congestion level indicators. In addition, in some implementations, any combination of the congestion indicator metrics (CIMs) described above, or any combination of the congestion indicator metrics (CIMs) described above with any combination of the above congestion indicator metrics (CIMS) from one or more nodes that are within one or more hops of the node 138.

If the node 138 determines that the measured congestion level indicator values (MCLIVs) do not exceed respective threshold values for those respective congestion level indicators or any combination or weighted combination thereof, then method 400 loops back to step 405 where the node 138 continues to monitor whether it is presently part of a cluster ad hoc network architecture.

When at least one measured-congestion level indicator value (MCLIV) exceeds a respective threshold value for the congestion level indicator (CLI), the method 400 proceeds to step 460, where the node 138 transmits a cluster formation request message to request that other nodes join the cluster ad hoc network architecture 180. In some implementations, the cluster formation request message can be transmitted as part of a high priority message that has priority over other types of messages to help ensure that the cluster architecture is formed as soon as possible. The term "high priority message" can generally be regarded as a separate message or as an information element or field that can be included as part of another message such as a standard HELLO message, a beacon, an advertisement message such as a routing advertisement message, a link advertisement message, etc. However, it should be appreciated that the term "high priority message" is not to be interpreted in a restrictive sense.

Each node that transmits a cluster formation request message becomes a candidate for the role of a clusterhead node. This cluster formation request message comprises information which allows other nodes to select a clusterhead node. In some implementations, the cluster formation request message includes information regarding the congestion level experienced by the transmitting node. This congestion level information can be used by the recipient node in an algorithm to select the clusterhead node. In one implementation, the cluster formation request message comprises the measured-congestion level indicator values (MCLIVs) that are measured by the node 138 and/or received by the node 138. Although not illustrated in FIG. 4, each node that receives one or more cluster formation request messages collects and stores measured-congestion level indicator values (MCLIVs) in cluster formation request messages.

At step 470, the node 138 and the other nodes which receive cluster formation request messages determine whether a selection time has expired for nominating a clusterhead node. If the selection time has not yet expired, then method 400 loops back to step 470 where the nodes continue to monitor whether selection time has expired.

After detection or "recognition" of network congestion by one or more of the nodes, at step 450, the node 138 triggers the "transition" from the distributed ad hoc network architecture to a cluster ad hoc network architecture. This generally involves notifying other nodes of detected congestion, and involves nomination and selection of a clusterhead node by the node 138 and the other nodes which have decided to join the cluster ad hoc network architecture 180. When the selection time expires, then method 400 proceeds to step 480 where the node 138 and the other nodes 112, 114, 116, 118, 120, 128, 130, 132, 134, 136, 140, 142, 146, 148, 150, 152, 156 which have decided to join the cluster ad hoc network architecture 180 participate in nominating and then selecting a clusterhead node 148 based on the stored measured-congestion level indicator values (MCLIVs) at each node. In one example implementation, the node which broadcast the first cluster formation request message can be selected as the clusterhead node. However, other algorithms are possible to select a node that is best suited to become the clusterhead node.

Once a clusterhead node is elected or selected, an uncoordinated period is established for nodes wishing to remain allocating resources in a distributed fashion, and a coordinated period is established for nodes wishing to have resources allocated in a more controlled fashion. After a cluster formation time ($t_{form}$), the selected clusterhead node 148 periodically broadcasts an indication of cluster formation with a description of methods for nodes to use to access the clusterhead node for cluster association and resource allocations.

Figure 5:
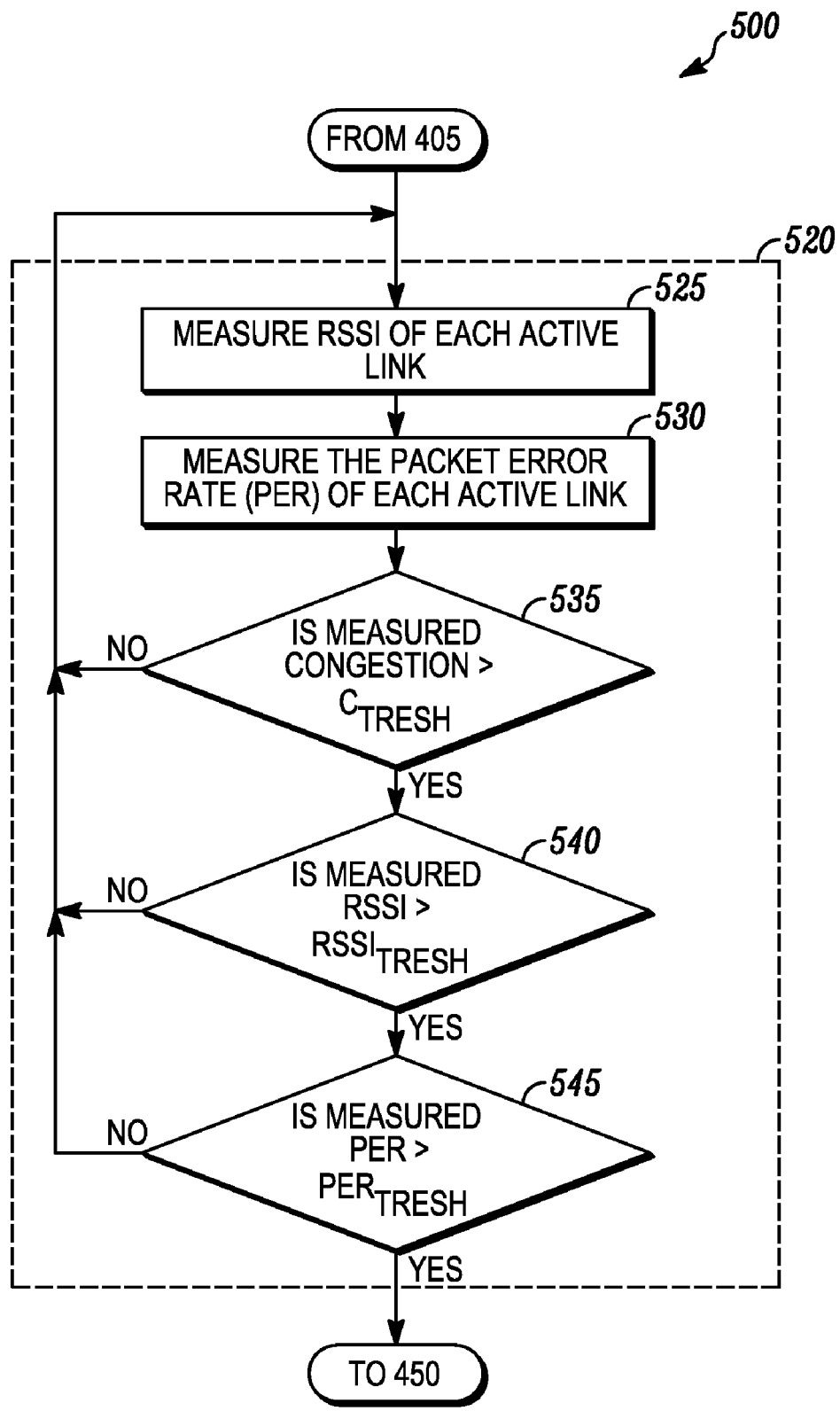
FIG. 5 is a flowchart showing a method for detecting congestion in an ad hoc network in accordance with one example implementation of the invention.

In practice, there are implementations for detecting congestion at step 420. One example implementation will now be described with reference to FIG. 5. FIG. 5 is a flowchart showing a method 500 for detecting congestion in an ad hoc network in accordance with one example implementation of the invention. The method 500 represents one non-limiting example of a technique for implementing step 420 of FIG. 4 to determine whether at least one measured-congestion level indicator values (MCLIVs) exceeds its respective threshold value, and as such, the method 500 will be described starting after step 415 of FIG. 4.

For each neighbor that the node 138 receives packets from, the node 138 monitors the Received Signal Strength Indication (RSSI) level of received packets from this neighbor. At step 525, the node 138 measures a Received Signal Strength Indication (RSSI) for each link 174, 176 that the node 138 is currently communicating on and/or along other links 171, 173, 178, 179 which neighbor nodes are communicating on (e.g., the link between nodes 148-146, the link between nodes 142-146, 136-134 and the link between nodes 134-132). A Received Signal Strength Indication (RSSI) is a generic radio receiver metric that provides a measurement (energy integral, not quality) of the received radio signal strength at the node 138.

At step 530, the node 138 measures a packet error rate (PER) for each link 174, 176 that the node 138 is currently communicating on and/or along other links 171, 173, 178, 179 which neighbor nodes are communicating on (e.g., the link between nodes 148-146, the link between nodes 142-146, 136-134 and the link between nodes 134-132). Depending on the implementation, for each neighbor that a node transmits packets to, the node can monitor the PER or a statistic derived from PER. In one implementation, measured packet errors include all retry attempts to transmit packets. In data packet based communication systems, packet error ratio or rate (PER) refers to a ratio between valid and invalid packets. Although a PER is used in this implementation, in alternative implementations, the node 138 can generally measure an "error ratio," where the term "error ratio" refers to the ratio of the number of bits, elements, characters, or blocks incorrectly received to the total number of bits, elements, characters, or blocks sent during a specified time interval. One example of alternative error ratios is bit error ratio or rate (BER). The BER estimate is based on the ratio of bit errors to packet length. The bit error count is obtained by encoding the decoder output symbols and comparing this sequence to the sequence of hard decisions made on the input symbols of the decoder. The error count is the number of symbol positions in which these two sequences differ. The BER is used in estimating the severity of interference or path loss affecting the communication link between the source node and the destination node.

At step 535, the node 138 determines, based on the measured congestion level indicator values (MCLIVs), whether the measured congestion exceeds a congestion threshold value ($C_{THRESH}$). The MCLIVs used to determine whether the measured congestion exceeds a congestion threshold value ($C_{THRESH}$) can be any of the CIM values described previously herein or any combination of the CIM values or a subset of the CIM values. For example, if the ratio of a period during which a channel is sensed as being busy with respect to an overall measurement period exceeds a certain threshold (e.g. 0.8), node 138 would determine that the MCLIV has exceeded $C_{THRESH}$. In one implementation, each node regularly measures the local congestion level and assesses its ability to transmit data queued for neighbor nodes. To enhance the robustness of the decision to form a cluster, the congestion level or measured-congestion level indicator values (MCLIVs) can be averaged over a period of time window ($t_{cavg}$).

When the measured congestion does not exceed the congestion threshold value ($C_{THRESH}$), the method 500 loops back to step 405 of FIG. 4. When the measured congestion exceeds the congestion threshold value ($C_{THRESH}$), the method 500 proceeds to step 540, where the node 138 determines whether the measured RSSI exceeds a RSSI threshold value ($RSSI_{THRESH}$). When the measured RSSI does not exceed the RSSI threshold value ($RSSI_{THRESH}$), the method 500 loops back to step 405 of FIG. 4.

When the measured RSSI exceeds the RSSI threshold value ($RSSI_{THRESH}$), the method 500 proceeds to step 545, where the node 138 determines whether the measured PER exceeds a PER threshold value ($PER_{THRESH}$).

When the measured PER does not exceed the PER threshold value ($PER_{THRESH}$), the method 500 loops back to step 405 of FIG. 4. When the measured PER exceeds the PER threshold value ($PER_{THRESH}$), the method 500 proceeds to step 460 of FIG. 4 where the node 138 transmits or "broadcasts" the cluster formation request message to request that other nodes join a cluster ad hoc network architecture.

Thus, in the implementation illustrated in FIG. 5, the node 138 broadcasts a cluster formation request message to other nodes in its neighborhood when: the congestion level is above a threshold, and (1) the PER is above a PER threshold value ($PER_{THRESH}$) while (2) the RSSI level is above the RSSI threshold value ($RSSI_{THRESH}$) for a specific neighbor. Requiring both conditions is beneficial when there is congestion without a high rate of packet loss because there is a higher likelihood that the channel is being used efficiently such that all packets are successfully transmitted. In this case it may not be necessary to create a cluster ad hoc architecture network. In addition, when there is congestion is negligible or a nonfactor, but there is a high degree of packet loss, triggering the formation of a cluster may not be beneficial because there is a higher likelihood that sufficient bandwidth is available to enable retransmissions. Although both triggering conditions are required in this implementation, either of these conditions with potentially different threshold values is acceptable as a stand-alone reason to broadcast a cluster formation request message and trigger a formation of a cluster ad hoc network. It may also be desirable for the node to consider additional conditions. For example, in some implementations, issues such as fairness or failure to meet QoS objectives resulting from too many simultaneous sessions may contribute to the need to form a cluster.

Figure 6:
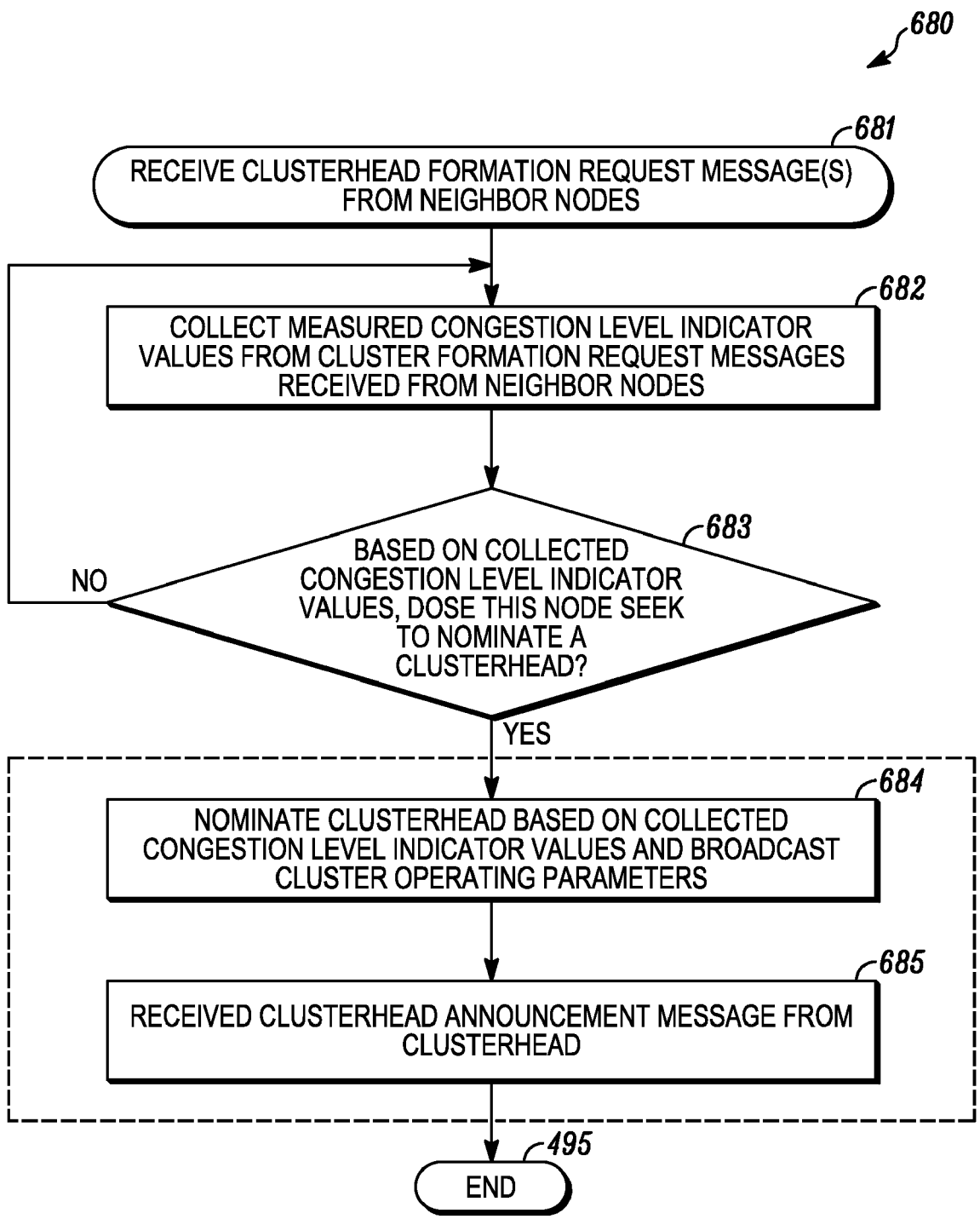
FIG. 6 is a flowchart showing a method for nominating and selecting a clusterhead node during formation of a cluster ad hoc network architecture by at least some of the nodes in the ad hoc network in accordance with some embodiments of the invention.

FIG. 6 is a flowchart showing a method 680 for nominating and selecting a clusterhead node 148 during formation of a cluster ad hoc network architecture 180 by at least some of the nodes 112, 114, 116, 118, 120, 128, 130, 132, 134, 136, 140, 142, 146, 148, 150, 152, 156 in the ad hoc network 100 in accordance with some embodiments of the invention. In one implementation, method 680 can be utilized to implement step 480 of FIG. 4.

At step 681, at least some of the nodes 116-156 in the network 100 receive one or more cluster formation request messages, and collect and store measured-congestion level indicator values (MCLIVs) from each of the cluster formation request messages at step 682. At step 683, each of the nodes 116-156 which receives a cluster formation request message, determines, based on the stored measured-congestion level indicator values (MCLIVs) received in each of the cluster formation request messages, whether that node will join the cluster ad hoc network architecture 180 and nominate a clusterhead node.

In this particular example, it is assumed that nodes 112, 114, 116, 118, 120, 128, 130, 132, 134, 136, 140, 142, 146, 148, 150, 152, 156 decide to join the cluster ad hoc network architecture 180, and therefore, in this implementation, only those nodes participate in nominating and selecting a clusterhead node. In other implementations, all nodes 112, 114, 116, 118, 120, 128, 130, 132, 134, 136, 140, 142, 146, 148, 150, 152, 156 can participate in nominating and selecting a clusterhead node. As such, at step 684, nodes 112, 114, 116, 118, 120, 128, 130, 132, 134, 136, 140, 142, 146, 148, 150, 152, 156 (i.e., the nodes which have decided to nominate a clusterhead node) can each transmits a clusterhead node nomination message. In this implementation, nodes 112-156 can select the node they want to nominate based on collected CLIVs and/or broadcast cluster operating parameters.

Upon receiving the clusterhead node nomination messages, the nodes 112, 114, 116, 118, 120, 128, 130, 132, 134, 136, 140, 142, 146, 148, 150, 152, 156 select node 148 as the clusterhead node. Techniques for nominating and selecting a clusterhead node or "root" node will not be described herein; however, techniques can be used such as those described, for example, in United States Patent Application Publication Number 20070204021, United States Patent Application Publication Number 20070201381, and United States Patent Application Publication Number 20070201382, all of which are assigned to the assignee of the present invention, and which the entire contents are incorporated herein by reference.

At step 685, the clusterhead node 148 transmits a clusterhead announcement message which identifies the clusterhead node 148. When the clusterhead announcement message is received by at each of the nodes 112, 114, 116, 118, 120, 128, 130, 132, 134, 136, 140, 142, 146, 148, 150, 152, 156 which decided to join the cluster ad hoc network architecture 180, the cluster ad hoc network architecture 180 is formed.

When a node receives a cluster formation request message from one of its neighbor nodes, the node should decide whether to re-transmit or re-broadcast the cluster formation request message. It is beneficial to re-transmit or re-broadcast the cluster formation request message if congestion is present in a wide area. In such situations, it may be necessary to reach a consensus among multiple nodes that may be located more than one hop away from each other. Furthermore, by re-transmitting or re-broadcasting the cluster formation request message, a node can join a cluster even if it is more than one hop away from the clusterhead.

Figure 7:
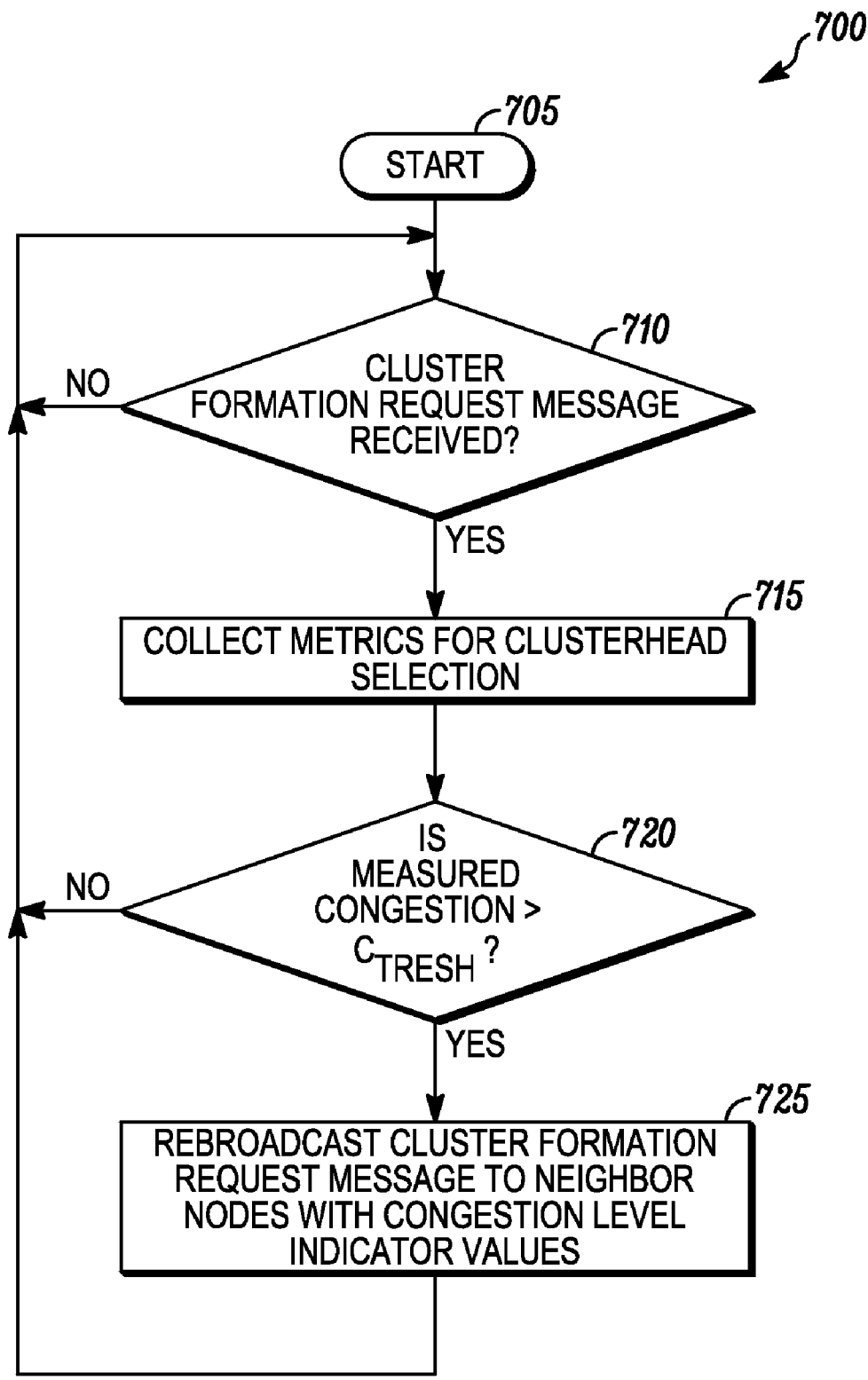
FIG. 7 is a flowchart showing a method for determining whether to re-broadcast a cluster formation request message in accordance with some embodiments of the invention.

FIG. 7 is a flowchart showing a method 700 for a node to determine whether to re-broadcast a cluster formation request message in accordance with some embodiments of the invention. The method 700 begins at step 705, and at step 710, a node determines whether a cluster formation request message has been received from one of its neighbor nodes. When a cluster formation request message has been received, the method 700 proceeds to step 715, where the node collects and stores measured-congestion level indicator values (MCLIVs) from the cluster formation request message for clusterhead node selection. The node uses one or more of the MCLIVs to determine a congestion measurement or "measured congestion."

At step 720, the node determines whether the measured congestion exceeds a congestion threshold value ($C_{THRESH}$). Step 720 is optional and is not necessary in all implementations. Moreover, in some implementations, the congestion threshold value ($C_{THRESH}$) can be the same congestion threshold value ($C_{THRESH}$) used at step 535 of FIG. 5. In other implementations, the congestion threshold value ($C_{THRESH}$) is lower than the congestion threshold value ($C_{THRESH}$) used at step 535 of FIG. 5, and thus more sensitive to the potential for congestion. Step 720 enables the neighbor nodes to better appreciate the magnitude and breadth of the congestion in the neighborhood. When the measured congestion level does not exceed the congestion threshold value ($C_{THRESH}$), the method 700 loops back to step 710, where the node waits for another cluster formation request message.

When the measured congestion level exceeds the congestion threshold value ($C_{THRESH}$), the method 700 proceeds to step 725, where the node re-transmits or re-broadcasts the cluster formation request message to neighbor nodes with the measured congestion level indicator values (MCLIVs) and/or any the congestion level indicator values (CLIVs) the node has measured itself and the MCLIVs and/or CLIVs contained in the cluster formation request message received from other neighbors or a combination of them.

Transition from the Cluster Ad Hoc Network Architecture to a Distributed Ad Hoc Network Architecture In other embodiments, techniques are provided which can allow a clusterhead node to detect a decrease in congestion in cluster ad hoc network architecture, and then initiate a transition from the cluster ad hoc network architecture to a distributed ad hoc network architecture when one or more congestion indicators fall below a certain threshold or are no longer present. To transition a cluster ad hoc network into a distributed ad hoc network, techniques are provided for enabling one or more nodes to recognize that operation in the cluster ad hoc network is no longer necessary and then initiate a transition from a cluster ad hoc network architecture to a distributed ad hoc architecture. For instance, in one implementation, the transition from the cluster ad hoc network architecture to a distributed ad hoc network architecture can be triggered when the clusterhead node detects a sufficient decrease in congestion based on one or more congestion level indicator values (CLIVs).

Figure 8:
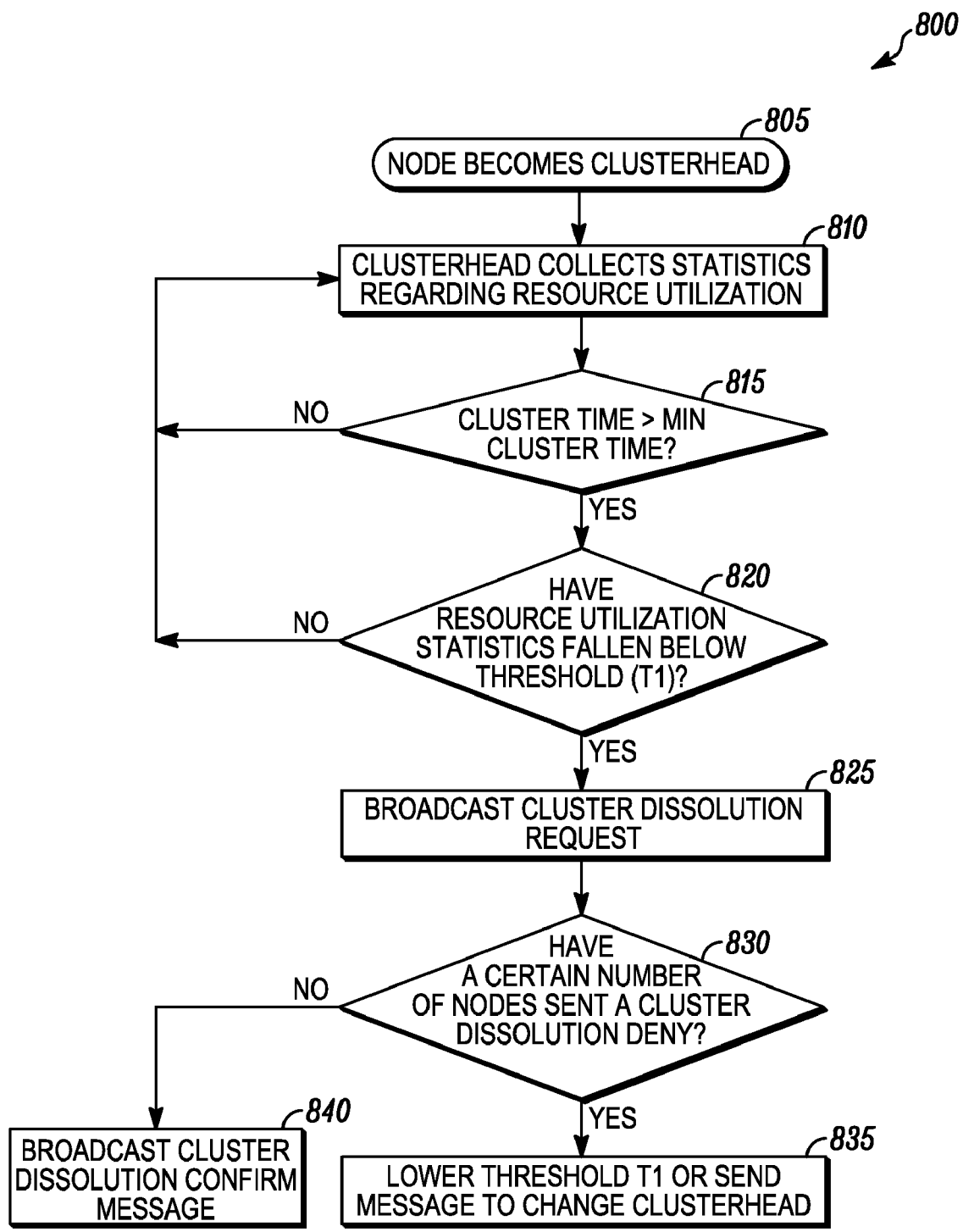
FIG. 8 is a flowchart showing a method which allows a clusterhead node to detect a reduction in congestion in a cluster ad hoc network and to initiate a transition from the cluster ad hoc network to a distributed ad hoc network architecture in accordance with some embodiments of the invention.

FIG. 8 is a flowchart showing a method 800 which allows a clusterhead node 148 to detect a reduction in congestion in a cluster ad hoc network 180 and to initiate a transition from the cluster ad hoc network 180 to a distributed ad hoc network architecture 100 in accordance with some embodiments of the invention.

The method 800 starts at step 805 when a node becomes the clusterhead node of the cluster ad hoc network 180.

At step 810, the clusterhead node 148 continuously determines (e.g., measures, collects and/or computes) radio resource utilization statistics (RRUSs). An example of a radio resource utilization statistic (RRUS) is the percentage of radio resources in the network that are being used and being allocated by the clusterhead node 148 in a unit of time. Other examples of radio resource utilization statistics (RRUS) are the number of links being allocated by the clusterhead node 148 in a unit of time, the average duration of allocations, the size of the allocations, and the inter-arrival time between consecutive allocations.

At step 815, the clusterhead node 148 determines whether an adequate amount of time (minimum cluster time) has elapsed. If the clusterhead node 148 determines that an adequate amount of time (minimum cluster time) has not elapsed, then the method 800 loops back to step 810 where the clusterhead node 148 continues to determine RRUSs.

If the clusterhead node 148 determines that an adequate amount of time (minimum cluster time) has elapsed, then the method 800 proceeds to step 820 where the clusterhead node 148 determines whether one or more of the RRUSs are less than a threshold (T1). The threshold (T1) is determined by the clusterhead node 148 after determining the RRUSs at step 810, and the threshold (T1) is set to account for any fluctuation of such RRUSs.

If the clusterhead node 148 determines that one or more of the RRUSs have not fallen below a threshold (T1), then the method 800 loops back to step 810 where the clusterhead node 148 continues to monitor or determine RRUSs. If the clusterhead node 148 determines that one or more of the RRUSs are less than a threshold (T1), then the method 800 proceeds to step 825 where the clusterhead node 148 transmits or broadcasts a Cluster Dissolution Request (CDR) message. The CDR message is received by all nodes in the cluster ad hoc network 180 and is re-broadcasted to any node that may be located more than one hop away from the clusterhead node 148.

Although not illustrated in FIG. 8, any nodes in the cluster ad hoc network 180 which determines that dissolution of the cluster ad hoc network 180 is not wanted (e.g., would be detrimental) (e.g., cause a decrease in data throughput) can transmit a Cluster Dissolution Deny (CDD) message. The CDD message can be sent either directly to the clusterhead node 148 or transmitted to the clusterhead node 148 with the help of other nodes if the sending node is more than one hop away.

At step 830, after sending the CDR message at step 825, the clusterhead node 148 waits for an amount of time (not shown), and then determines whether the number of nodes which have replied with a CDD message in a certain time period exceeds a threshold number.

If the clusterhead node 148 determines that the number of nodes which have replied with CDD messages exceeds the threshold number, then the method 800 proceeds to step 835, where the clusterhead node 148 can either (1) lower the threshold T1 and return to step 820, or (2) initiate procedures to change the clusterhead node 148 by transmitting a message requesting that the clusterhead node be changed.

If the clusterhead node 148 determines that the number of nodes which have replied with CDD messages is less than the threshold number, then the method 800 proceeds to step 840, where the clusterhead node 148 transmits or broadcasts a Cluster Dissolution Confirm (CDC) message to initiate the transition from the cluster ad hoc network 180 to a distributed ad hoc network architecture 100. In one implementation, the CDC message indicates an amount of time until the clusterhead node 148 will stop serving as the clusterhead. When this amount of time elapses, nodes which were part of the cluster ad hoc network 180 would then begin operating as part of the distributed ad hoc network architecture 100.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method within a distributed ad hoc network comprising a plurality of nodes for determining whether to transition to a cluster ad hoc network architecture or continue operating in a distributed ad hoc network architecture, the method comprising:

operating a node of the plurality of nodes to:
measure a Received Signal Strength Indication (RSSI) for each link that the node is within communication range of;
measure a packet error rate (PER) for each link that the node is within communication range of;
determine based on measured congestion level indicator values (MCLIVs) received from one or more other nodes, whether the measured congestion exceeds a congestion threshold value ($C_{THRESH}$);
determine based on the measured RSSI, whether the measured RSSI exceeds a RSSI threshold value ($RSSI_{THRESH}$) when the measured congestion level exceeds the congestion threshold value ($C_{THRESH}$);
determine based on the measured PER, whether the measured PER exceeds a PER threshold value ($PER_{THRESH}$) when the measured RSSI exceeds the RSSI threshold value ($RSSI_{THRESH}$); and
decide whether to transition to a cluster ad hoc network architecture or continue operating in a distributed ad hoc network architecture based at least in part on the results of the determining operations.

2. A method according to claim 1,
wherein the deciding step is further based at least in part on the results of operating the node to:
determine whether at least one of the received measured-congestion level indicator values (MCLIVs) exceed respective threshold values.

3. A method according to claim 2, further comprising operating the node to:
transmit a cluster formation request message from the node when at least one measured congestion level indicator value exceeds a respective threshold value for the congestion level indicator, wherein the cluster formation request message comprises: a request that other nodes join the cluster ad hoc network architecture, and the measured-congestion level indicator values (MCLIVs).

4. A method according to claim 1, further comprising:
selecting a clusterhead node, at the node and the other nodes which decide to join the cluster ad hoc network architecture, based on measured-congestion level indicator values (MCLIVs).

5. A method according to claim 3, wherein operating the node to transmit a cluster formation request message, comprises operating the node to:
transmit the cluster formation request message to request that other nodes join a cluster ad hoc network architecture when the node determines that the measured PER exceeds the PER threshold value ($PER_{THRESH}$), wherein the cluster formation request message comprises the measured-congestion level indicator values (MCLIVs).

6. A method according to claim 4, wherein the step of selecting a clusterhead node, at the node and the other neighbor nodes which decide to join the cluster ad hoc network architecture, based on measured-congestion level indicator values (MCLIVs), comprises:
receiving, at each node, one or more cluster formation request messages;
storing, at each node, measured-congestion level indicator values (MCLIVs) from each of the cluster formation request messages;
determining, at each node based on the stored measured-congestion level indicator values (MCLIVs) from each of the cluster formation request messages, whether the node will nominate a clusterhead node; and
transmitting, from each node which decides to nominate a clusterhead node, a clusterhead node nomination message.

7. A method according to claim 6, further comprising:
receiving, at each node which joins the cluster ad hoc network architecture, a clusterhead announcement message which identifies the clusterhead node.

8. A method according to claim 1, further comprising operating the node to:
measure one or more congestion level indicator values (CLIVs) based on information received from the one or more other nodes when the node is not part of a cluster ad hoc network architecture.

9. A method according to claim 8, wherein the one or more congestion level indicator values (CLIVs) comprise one or more congestion indicator metrics (CIMs) comprising:
a ratio of a period during which a channel is sensed as busy to an overall measurement period;
a difference between inbound data rate of a given data flow and outbound data rate of the given data flow;
a packet queuing delay;
a forecasted data load based on flow setup control messages exchanged on a common channel;
a data load computed based on the number of data flows and their respective traffic characteristics;
a ratio of busy resources to resources in a resource allocation message;
an average of a number of retransmissions per packet;
a percentile of the number of retransmissions per packet; and
a function of average packet error rate and average Signal to Interference-plus-Noise Ratio (SINR) in previous packets successfully received.

10. A node operating as part of a distributed ad hoc network architecture, the node comprising:
a processor designed to:
measure a Received Signal Strength Indication (RSSI) and a packet error rate (PER) for each link that the node is within communication range of; and
determine based on measured-congestion level indicator values (MCLIVs) received from one or more other nodes, whether the measured congestion level exceeds a congestion threshold value ($C_{THRESH}$),
determine based on the measured RSSI, whether the measured RSSI exceeds a RSSI threshold value ($RSSI_{THRESH}$) when the measured congestion level exceeds the congestion threshold value ($C_{THRESH}$),
determine whether the measured PER exceeds a PER threshold value ($PER_{THRESH}$) when the measured RSSI exceeds the RSSI threshold value ($RSSI_{THRESH}$), and decide whether to transition to a cluster ad hoc network architecture or continue operating in a distributed ad hoc network architecture based at least in part on the results of the determining operations.

11. A node according to claim 10, wherein the processor is further designed to decide whether to transition to a cluster ad hoc network architecture or continue operating in a distributed ad hoc network architecture based at least in part on the results of the processor operating to:
   determine whether at least one of the measured-congestion level indicator values (MCLIVs) exceed respective threshold values.

12. A node according to claim 11, wherein the processor is designed to generate a cluster formation request message comprising a request that other nodes join the cluster ad hoc network architecture, and the measured-congestion level indicator values (MCLIVs),
   and wherein the node further comprises:
   a transmitter designed to transmit the cluster formation request message.

13. A node according to claim 10, wherein the processor is further designed to select a clusterhead node based on measured-congestion level indicator values (MCLIVs).

14. A node according to claim 12, wherein the processor is designed to generate the cluster formation request message when the node determines that the measured PER exceeds the PER threshold value ($PER_{THRESH}$).

15. In a cluster ad hoc network comprising a clusterhead node and one or more other nodes operating as part of the cluster ad hoc network, a method for determining whether to transition to a distributed ad hoc network architecture, the method comprising:
   determining, at the clusterhead node, whether resource utilization in the cluster ad hoc network has decreased beyond a threshold; and
   initiating, at the clusterhead node, a transition from the cluster ad hoc network to the distributed ad hoc network architecture when the resource utilization in the cluster ad hoc network has decreased beyond a threshold (T1), by transmitting a Cluster Dissolution Request (CDR) message from the clusterhead node to other nodes in the cluster ad hoc network if one or more of one or more radio resource utilization statistics (RRUSs) are less than the threshold (T1);
   determining, at nodes which receive the Cluster Dissolution Request (CDR) message, whether those nodes oppose dissolution of the cluster ad hoc network; and
   transmitting a Cluster Dissolution Deny (CDD) message from one or more of the nodes which oppose dissolution of the cluster ad hoc network to the clusterhead node;
   determining, at the clusterhead node, whether the number CDD messages received by the clusterhead node exceeds a threshold number.

16. A method according to claim 15, wherein the step of determining, at the clusterhead node, whether resource utilization in the cluster ad hoc network has decreased beyond a threshold, comprises:
   determining, at the clusterhead node, one or more radio resource utilization statistics (RRUSs) which characterize radio resources being allocated by the clusterhead node;
   determining, at the clusterhead node, whether a time has elapsed; and
   determining, at the clusterhead node, whether one or more of the RRUSs are less than a threshold (T1) if the clusterhead node determines that the time has elapsed.

17. A method according to claim 15, wherein the step of initiating, at the clusterhead node, a transition from the cluster ad hoc network to the distributed ad hoc network architecture when the resource utilization in the cluster ad hoc network has decreased beyond a threshold, comprises:
   transmitting, from the clusterhead node, a Cluster Dissolution Confirm (CDC) message to initiate the transition from the cluster ad hoc network to a distributed ad hoc network architecture when the clusterhead node determines that the number of nodes which have replied with CDD messages is less than the threshold number.

18. A method according to claim 15, further comprising:
   lowering, the threshold T1 at the clusterhead node when the clusterhead node determines that the number of CDD messages received by the clusterhead node exceed the threshold number.

19. A method according to claim 15, when the clusterhead node determines that the number of CDD messages received by the clusterhead node do not exceed a threshold number, further comprising:
   transmitting, from the clusterhead node, a message requesting a new clusterhead node when the clusterhead node determines that the number of CDD messages received by the clusterhead node exceed the threshold number.

20. A clusterhead node which controls one or more other nodes operating as part of a cluster ad hoc network, the clusterhead node comprising:
   a processor designed to:
      determine whether resource utilization in the cluster ad hoc network has decreased below a threshold, and to initiate a transition from the cluster ad hoc network to the distributed ad hoc network architecture when the resource utilization in the cluster ad hoc network has decreased beyond a threshold, and
      determine whether resource utilization in the cluster ad hoc network has decreased below the threshold based on whether one or more radio resource utilization statistics (RRUSs) are less than a threshold (T1), wherein the radio resource utilization statistics (RRUSs) characterize one or more radio resources being allocated by the clusterhead node; and
   a transmitter designed to transmit a Cluster Dissolution Request (CDR) message to other nodes in the cluster ad hoc network if one or more of the RRUSs are less than the threshold (T1).

21. A clusterhead node according to claim 20, further comprising:
   a receiver designed to receive Cluster Dissolution Deny (CDD) messages from one or more of the nodes which receive the Cluster Dissolution Request (CDR) message and oppose dissolution of the cluster ad hoc network.

22. A clusterhead node according to claim 21, wherein the processor is further designed to:
   determine whether the number of CDD messages exceeds a threshold number.

23. A clusterhead node according to claim 22, wherein the processor is further designed to initiate the transition from the cluster ad hoc network to the distributed ad hoc network architecture when the resource utilization in the cluster ad hoc network has decreased beyond the threshold, and
   wherein the transmitter is designed to transmit a Cluster Dissolution Confirm (CDC) message, when the clusterhead node determines that the number of nodes which have replied with CDD messages is less than the threshold number, to initiate the transition from the cluster ad hoc network to a distributed ad hoc network architecture.

24. A clusterhead node according to claim 22, wherein the processor is further designed to:

lower the threshold T1 when the clusterhead node determines that the number of CDD messages received by the clusterhead node exceed the threshold number.

25. A clusterhead node according to claim 22, wherein the transmitter is further designed to:

transmit a message requesting a new clusterhead node when the clusterhead node determines that the number of CDD messages received by the clusterhead node exceed the threshold number.

* * * * *

UNITED STATES PATENT AND TRADEMARK OFFICE
CERTIFICATE OF CORRECTION

PATENT NO. : 7,792,059 B2
APPLICATION NO. : 11/849434
DATED : September 7, 2010
INVENTOR(S) : Fonseca, Jr. et al.

It is certified that error appears in the above-identified patent and that said Letters Patent is hereby corrected as shown below:

On the Title Page, in Field (56), under "OTHER PUBLICATIONS", in Column 2, Line 4, delete "As" and insert -- Ad --, therefor.

In Fig. 4, Sheet 4 of 8, for Tag "460", in Line 1, delete "BOARDCAST" and insert -- BROADCAST --, therefor.

In Fig. 4, Sheet 4 of 8, for Tag "480", in Line 3, delete "BOARDCAST" and insert -- BROADCAST --, therefor.

In Fig. 5, Sheet 5 of 8, for Tag "535", in Line 3, delete "$C_{TRESH}$" and insert -- $C_{THRESH}$ --, therefor.

In Fig. 5, Sheet 5 of 8, for Tag "540", in Line 3, delete "$RSSI_{TRESH}$" and insert -- $RSSI_{THRESH}$ --, therefor.

In Fig. 5, Sheet 5 of 8, for Tag "545", in Line 3, delete "$PER_{TRESH}$" and insert -- $PER_{THRESH}$ --, therefor.

In Fig, 6, Sheet 6 of 8, for Tag "683", in Line 3, delete "DOSE" and insert -- DOES --, therefor.

In Fig. 7, Sheet 7 of 8, for Tag "720", in Line 3, delete "$C_{TRESH}$" and insert -- $C_{THRESH}$ --, therefor.

In Column 2, Line 43, delete "invention; and" and insert -- invention; --, therefor.

In Column 7, Line 39, delete "(CLIVS)" and insert -- (CLIVs) --, therefor.

In Column 8, Line 50, delete "rate; and" and insert -- rate; --, therefor.

Signed and Sealed this
Twenty-seventh Day of November, 2012

David J. Kappos
*Director of the United States Patent and Trademark Office*

In Column 8, Line 54, delete "thereof, and" and insert -- thereof; and --, therefor.

In Column 9, Line 2, delete "(CIMS)" and insert -- (CIMs) --, therefor.

In Column 13, Line 9, delete "($C_{THRESH}$)-" and insert -- ($C_{THRESH}$). --, therefor.

In Column 17, Line 52, in Claim 15, delete "number" and insert -- number of --, therefor.